United States Patent Office.

HENRY A. JONES, OF BROOKLYN, NEW YORK.

Letters Patent No. 100,638, dated March 8, 1870.

IMPROVED TABLET, TOKEN, OR CHECK, TO BE USED IN LIFE INSURANCE.

The Schedule referred to in these Letters Patent and making part of the same.

*To all whom it may concern:*

Be it known that I, HENRY A. JONES, of Brooklyn, in the county of Kings, and State of New York, have invented a new and useful Tablet, Token, or Check, made of hard rubber or other suitable material, for use in facilitating and simplifying the business of life insurance; and I do hereby declare the following to be a full, clear, and exact description of said tablet, token, or check, together with the method employed in using the same.

The object of this invention is to lessen the labor of agents or officers of life-insurance societies, and thus, by making possible small and frequent payments or deposits, to meet the demands and needs of small investors, and thus to place the advantages of life insurance more fully within the reach of the industrial classes.

It is well known that under the ordinary plan of conducting the business of life insurance very considerable payments must be made by the assured at stated periods, as annually, semi-annually, or quarterly, and that annual payments are preferred by the company assuring, as involving less labor than the more frequent payments.

Were the quarterly payments further and more minutely subdivided into monthly or weekly payments, the labor of collecting and receipting for the small sums thus made payable at very brief intervals would be so great as to become unprofitable, and consequently impracticable.

The laboring man, in the receipt of a moderate weekly compensation, ordinarily finds it difficult to meet regular and considerable payments at wide, stated periods, while he scarcely feels the expenditure of a proportional sum weekly; yet the fact that no simple system exists by which the workingman can make such small and frequent deposits in payment for insurance upon his life, renders it extremely difficult for him to avail himself of the benefits of this valuable system, by which future poverty may be averted from himself and his family.

The improvements, then, which I have instituted for the perfect simplification of the details of life insurance, are as follows:

Checks of an indestructible character, embossed with a suitable device, and bearing the denomination of the sum to be deposited weekly, as "twenty-five cents," "fifty cents," "seventy-five cents," or "one dollar," are placed in the hands of the agent, foreman, or employer, or president of the co-operative or other association of which the assured is a member, and after the risk is accepted by the insurance company, the assured deposits the stipulated sum at the end of each week, and receives therefor a check for the same amount.

After four weekly deposits have thus been made, the four checks are received by the agent or by the company, and the policy is delivered to the assured; or if the company so elects, the first four weekly payments or deposits may be demanded in one sum, it being understood that the policy is not put in force until four full weekly payments have been made.

Thereafter the weekly payments are made and the checks delivered, and at the end of each and every month a printed or other receipt is given the assured in exchange for the accumulated checks.

The use of the checks avoids the necessity of much clerical labor in the preparation of receipts and the entry of the same upon the books, and at the same time gives a tangible and valuable return for each periodical deposit, while the small payments are easily met, and the cost of insurance is scarcely perceptible.

By this simple machinery the advantages of life insurance are extended to a large class of persons of little or no accumulated property, dependent solely upon their labor for support, and who, dying, would probably leave little, except the policy thus secured, for the future support of the survivors of the family.

I have spoken of the checks which I use in place of receipts, and while I may find it convenient to employ the products of the printing-press for this purpose, or any other system of checks which can be rapidly multiplied, I yet use and much prefer the vulcanized India-rubber or "hard-rubber" check, suitably embossed, as being indestructible, light, and ornamental, and less easily counterfeited than printed matter.

In the system of "Industrial Savings, Life and Endowments," which I have instituted, and to which these Letters Patent relate, I have borne in mind the peculiar necessity that money expended by the industrial classes should absolutely buy something, even though the stipulated payments should not be continued for the period agreed upon.

I have, therefore, provided for a return of a certain defined sum in cash at the end of six months or one year from the date of the policy, payments having meantime been kept up, which sum is constantly and steadily increased as payments are added.

To such as prefer to continue the stipulated payments and borrow, by the hypothecation of the policy, a like sum, I provide for loans at the legal rate of interest.

This feature, added to the fact that the weekly checks which I employ as a medium of exchange, in lieu of receipts, are transferable, and may be used in payment on account of the monthly receipts, by any person, reduces the whole system to one of economy and strict equity, and places the advantages of life insurance within the reach of the industrial classes, without danger of loss or forfeiture.

What I claim as new, and desire to secure by Letters Patent of the United States, is—

1. A tablet, token, or check, made of hard rubber, or any suitable material, and provided with a suitable inscription, so as to be used for the purposes herein set forth.

2. The use of the herein-described tablet, token, or check, in the manner herein set forth, by which the business of life insurance is simplified and made available to the industrial classes.

HENRY A. JONES.

Witnesses:
FRANK FULLER,
GEO. MARSHALL.